June 24, 1930.  W. B. CONRAD  1,768,396
BEET HARVESTER
Filed May 18, 1929  4 Sheets-Sheet 1
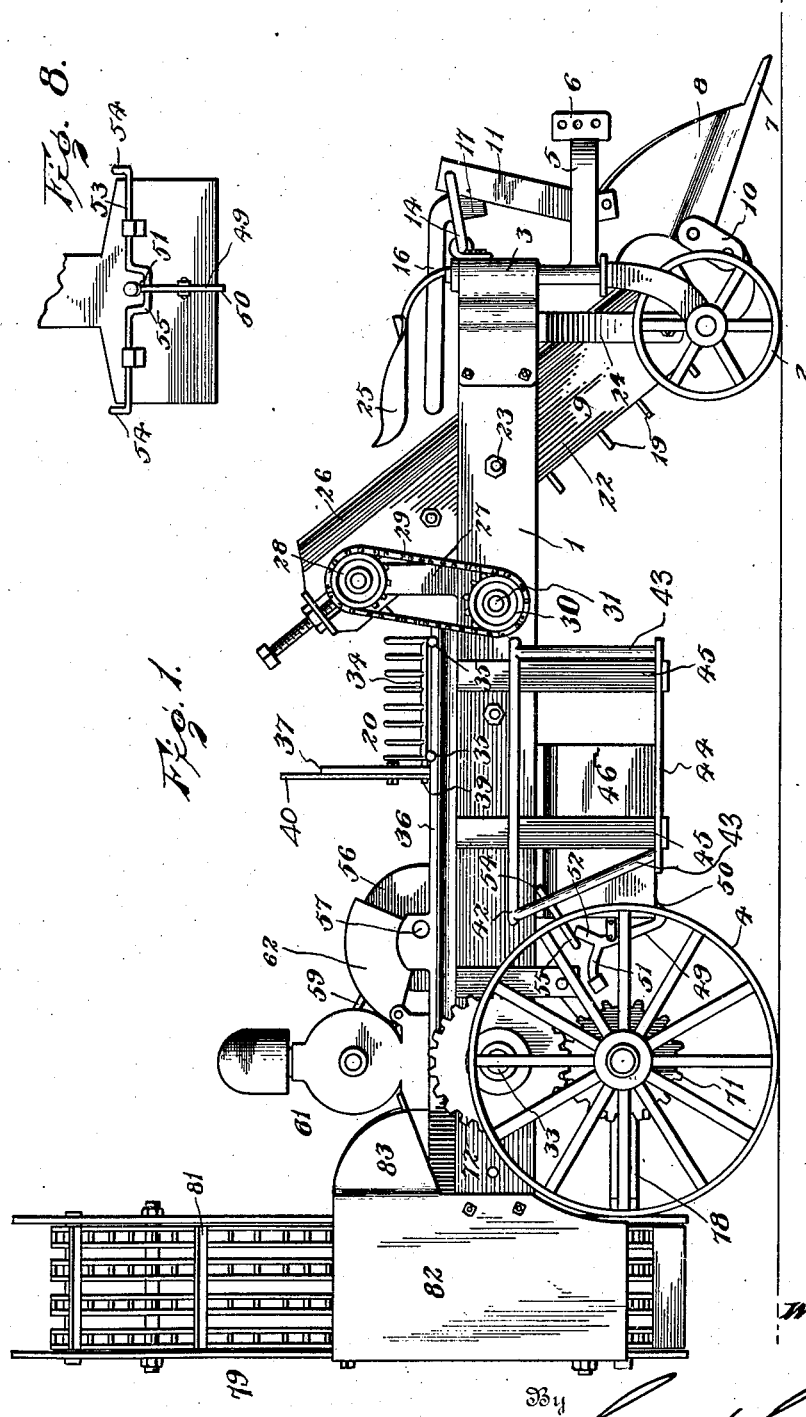
Inventor
W. B. Conrad

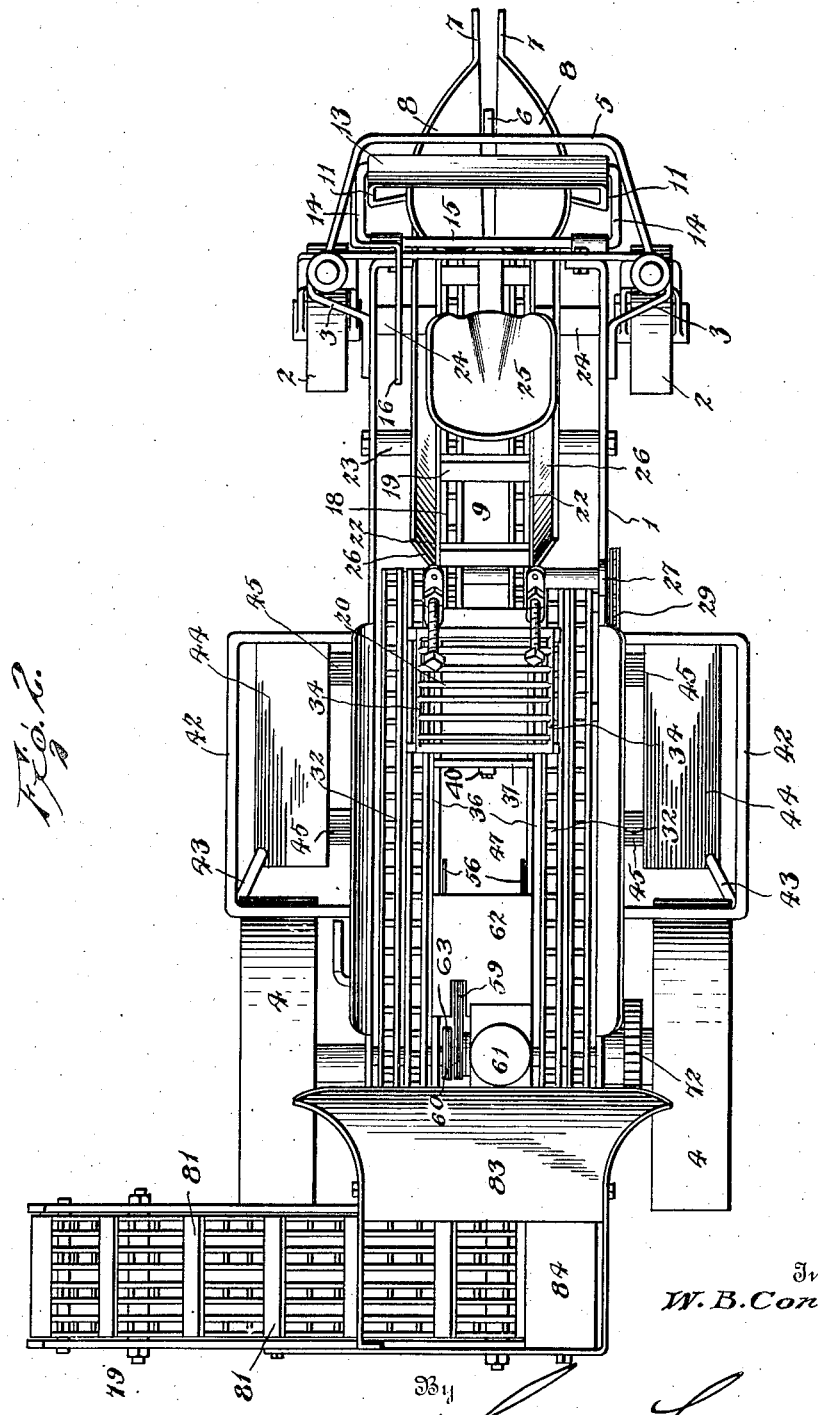

June 24, 1930.  W. B. CONRAD  1,768,396
BEET HARVESTER
Filed May 18, 1929  4 Sheets-Sheet 3
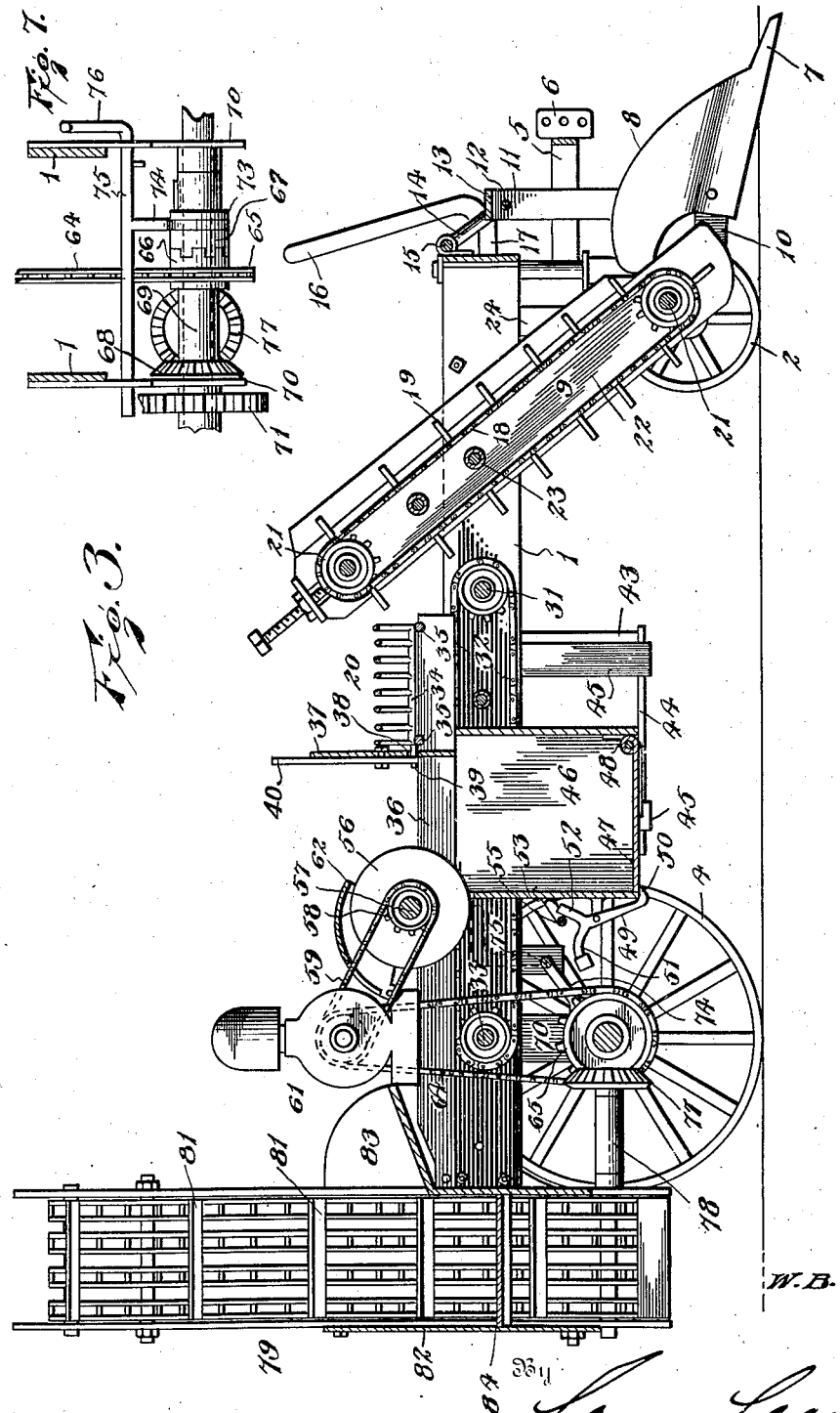
Inventor
W. B. Conrad
By Lacey & Lacey, Attorneys

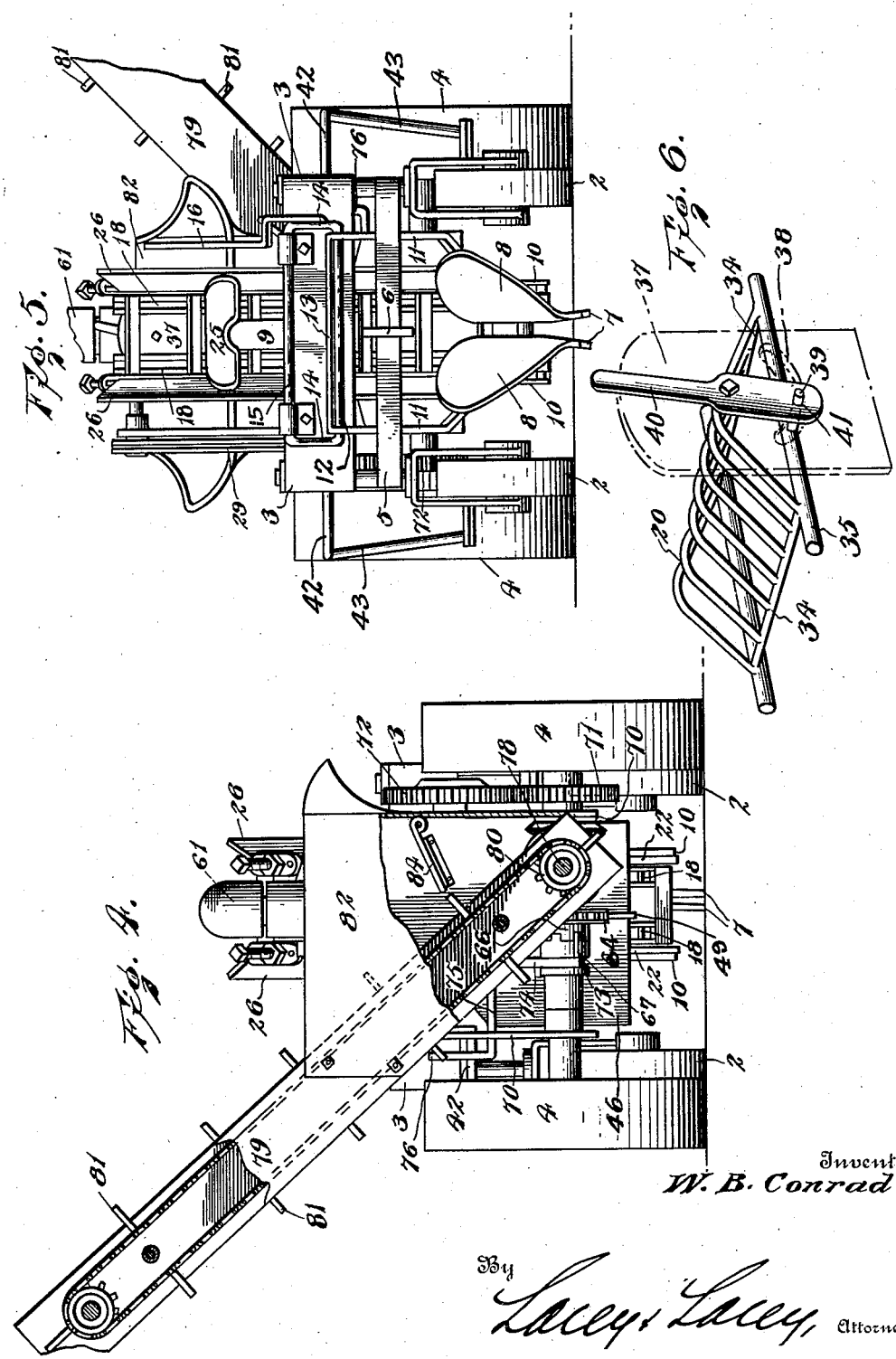

Patented June 24, 1930

1,768,396

UNITED STATES PATENT OFFICE

WILLIAM B. CONRAD, OF CASPER, WYOMING

BEET HARVESTER

Application filed May 18, 1929. Serial No. 364,102.

This invention relates to beet harvesters and similar machines and has for its object the provision of a machine which may be easily drawn over a field along a row of plants and which will operate to lift the roots from the ground and deliver them to topping stations where the tops are removed, the tops being deposited in a receptacle provided therefor and the bodies being transferred to an elevator which will carry them laterally from the machine and deposit them in a wagon traveling alongside the machine. The invention has for a particular object the provision of cutters operated by power independent of the power of the machine and by the action of which the tops of beets presented thereto will be quickly and effectually severed. The invention is illustrated in the accompanying drawings and will be hereinafter fully set forth.

In the drawings:

Figure 1 is a side view of a machine embodying my improvements, the digger being raised, Fig. 2 is a top plan view of the same, Fig. 3 is a vertical longitudinal section, the digger being lowered, Fig. 4 is a rear end elevation partly broken away, Fig. 5 is a front end elevation, Fig. 6 is a detail view of the deflector, Fig. 7 is a detail of a portion of the gearing for driving the rear elevator and the conveyers, Fig. 8 is a detail elevation of the latch controlling the tops-dumping door.

In carrying out the invention, there is provided a substantialy oblong main frame 1 which is suported at its front end by caster wheels 2 having their spindles or shanks rotatably mounted in bearing brackets 3 provided at the corners of the frame. At the rear end, the main frame is supported by ground wheels 4 and the axle of said wheels may be utilized for operating the several conveyers. At the front end of the frame is a draft bar 5 provided with a clevis 6 or similar device, it being intended that the machine be drawn by draft animals or a tractor and the working parts driven from the rear wheels or from a small motor mounted on the frame.

At the front end of the main frame, a digger or root lifter is mounted, said digger or lifter consisting of two similar shares or points 7 disposed longitudinally of the machine and near but at opposite sides of the medial longitudinal line thereof. These shares carry moldboards or wings 8 and they converge rearwardly, as will be understood upon reference to Fig. 2, while the opposed surfaces of the moldboards are so shaped that the up-lifted root is supported and directed onto the elevating conveyer 9 arranged immediately at the rear of the digger and longitudinally of the frame. The rear ends of the shares 7 are connected with the lower end of the frame of the conveyer 9 by links 10 which are pivoted at their opposite ends to the shares and the conveyer frame, respectively, while to the uper margins of the moldboards are secured the lower ends of arms 11 which are hung upon a cross rod 12 and preferably have their upper ends connected by a cross bar 13. The rod 12 is carried by cranks 14 at the ends of a rock shaft 15 which is mounted upon the end of the frame, and on one of the cranks is formed or s cured a hand lever 16 whereby to rock the shaft and raise or lower the digger. A stop lug 17 on the same crank is adapted to impinge against the frame and limit the lowering movement so that the digger cannot be set to run at such a depth that it will not do effective work and will unduly increase the draft. The weight of the arms, the cranks and the diggers together with the traction of the digger in the ground when the machine is at work will cause the lowered digger to penetrate the soil at the sides of the row of tubers, and the diggers are removed from the ground when the machine is not to work by rocking the lever 16 downwardly and rearwardly so that the lifting cranks 14 will be swung upwardly and thereby act upon the arms 11 to lift the same with the diggers attached thereto. When the digger is raised, the links 10 assume a nearly vertical position so that they are on a dead center and the digger will remain raised until the lever 16 is again positively actuated.

The elevator 9 consists of an endless belt composed of parallel side chains and blades or flights 19 disposed transversely between the chains at intervals and secured thereto. The flights are provided in sufficient number to support the up-lifted roots and they push the roots to the upper end of the elevator where they are delivered onto a divided table or deflector 20. The elevator belt is mounted at its upper and lower bights upon sprocket drums or rollers 21 journaled in side bars 22 which are carried by the main frame and may conveniently be secured in place by a long bolt 23 fitted through the side bars of the main and conveyer frames and by hanger braces 24 secured to the front ends of the frame. The driver's seat 25 is mounted on the front end of the main frame over the elevator, as shown, and the sides of the conveyer frame are provided with flared rails 26 to prevent the tubers rolling off the belt. The upper roller 21 has its axis or shaft extended through the adjacent side bar 22 and a supporting post 27 on the main frame and carries a sprocket 28 on its outer end, a sprocket chain 29 being trained around said sprocket and around a sprocket 30 provided on one end of a shaft 31 which extends across the main frame at the rear of the elevator and below the upper end thereof. Said shaft 31 supports the forward bights of table conveyers 32 arranged at each side of the frame and longitudinally of the same and adapted to convey the clods of dirt which may have clung to the roots and deposit them upon the ground at the rear of the machine. The conveyers 32 consist of endless chains trained around sprockets on the shaft 31 and around similar sprockets on a shaft 33 at the rear of the machine. The divider table or deflector 20 is disposed immediately at the rear of the elevator 9 and consists of a plurality of transverse rods each inclined downwardly from its center toward the sides of the machine so that the tubers delivered onto the table by the elevator will be deflected toward the sides of the machine and deposited upon the respective conveyer tables 32. At their ends, the several rods are united with side rods 34 whereby they are fixed in parallel relation and the side rods are connected by transverse bars or runners 35 which rest slidably on the upper edges of longitudinal rails 36, said rails being disposed between the conveyers 32 and rigidly connected with the main frame in any convenient manner. An upright shield 37 is provided at the rear of the table 20 and this shield has a concave slot 38 in its lower portion through which passes a stud 39 projecting from the rear of the deflector or divider table. A lever 40 is pivoted on the shield above the slot 38 and concentric therewith, and in the lower end portion of said lever is a slot 41 receiving the stud 39. This shield prevents the beet bodies passing directly rearwardly over the divider table and aids in deflecting them toward the sides of the machine. By properly setting the lever 40 the deflector may be set with its ridge on the medial line of the machine or at either side thereof. In the central position, the roots discharged from the elevator will be deflected part toward each conveyer 32 but if the deflector be shifted to one side of the center all the roots will be turned to the conveyer at the opposite side.

On each side of the main frame and located adjacent the conveyers 32 is a frame 42 which is in the form of a rail extending laterally from and longitudinally of the main frame and having hanger rods 43 secured at its corners and depending therefrom to support a platform 44 which is also supported by inner hangers 45 secured to the main frame and depending therefrom and having their lower ends extended outwardly to project under and be secured to the respective platform. Attendants will stand upon each platform and as the beet bodies are delivered onto the conveyer 32, they will grasp the bodies successively and present the heads thereof to the cutters at the rear of the shield 37 whereby the tops will be severed and drop at once into a hopper 46 carried by the main frame and equipped with a downwardly opening door 47 which constitutes the bottom of the same. The door 47 is normally closed by a spring 48 which is strong enough to overcome the weight of the door but will yield to a load of tops thereon. A latch 49 is fulcrumed on the rear wall of the hopper and is formed at its lower end with a hook 50 adapted to engage under the edge of the door and support it in raised closed position. Above its fulcrum, the latch is provided with a weighted arm 51 whereby the latch will be held to its operative position, and also with a trip arm 52 the manipulation of which will release the latch to effect discharge of a load. Extending across the rear of the hopper is a rock shaft 53 having crank handles 54 at its ends and provided at its center with a crank 55 arranged to bear against the end of the trip arm 52. With the parts in the positions shown in Fig. 3, the severed beet tops drop from the cutters into the hopper and accumulate therein. When the hopper is full, either attendant will grasp a handle 54 and rock the shaft 53 so that the center crank 55 will press the arm 52 toward the hopper thereby swinging the latch hook 50 from under the hopper whereupon the door will swing downwardly under the weight of the load of beet tops and discharge the same. Relieved of the load, the spring 48 will close the door and, when the handle 54 is released, the weighed arm 51 will return the latch to active position.

The cutters are preferably circular disks 56 with sharp edges, and are carried by a transverse shaft 57 mounted in suitable bearings on the rails 36 between the conveyers 32 and spaced rearwardly from the shield 37 so that an open space is provided above the hopper through which the severed tops may fall. The shaft 57 is equipped with a sprocket 58 around which a sprocket chain 59 is trained, said chain being also trained around a sprocket 60 on the drive shaft of a motor 61, shown conventionally and preferably a small internal combustion engine. The motor is mounted on the rails 36 and in front of the motor a guard 62 extends over the cutters. A second sprocket 63 is secured on the motor drive shaft and a chain 64 is trained about the same and a sprocket 65 loose upon the rear exle and having a clutch hub 66 adapted to engage a mating clutch hub 67. A gear 68 is fixed to the inner end of a sleeve 69 which is journaled through a hanger bracket 70 and is keyed upon the rear axle, the hub 67 being splined on said sleeve and a spur gear 71 being fixed to the outer end of the sleeve and meshing with a spur gear 72 secured upon the end of the shaft 33 which actuates the conveyers 32. The gear 71 has openings therethrough in order that it may be bolted to the adjacent ground wheel 4, if the necessity arises. The clutch hub 67 is provided with an annular groove 73 in which is engaged a fork 74 fixed to a rod 75 slidably mounted in the frame and having its ends formed into handles 76 which may be easily grasped by the attendants upon the platforms 44. By shifting the slide rod 75 the clutch may be thrown into or out of gear, and it will be understood that by the described arrangement the working parts may be driven from the motor 61 or from a rear wheel 4. If the engine fuel, for example, should be unexpectedly exhausted, the gear 71 may be bolted to the rear wheel 4 and the operation continue. If a purchaser of a machine should prefer, the engine may be omitted and the machine driven solely by the rear ground wheel.

The beveled gear 68 meshes with a similar gear 77 on a shaft 78 which extends rearwardly into and through the lower end of the frame of the rear elevating conveyer 79. Sprocket gearing, indicated at 80, transmits the motion of the shaft 78 to the elevating conveyer 79 whereby to actuate the same, and said elevator consists of endless chains carrying flights 81, and is disposed transversely of the main frame at the rear end of the same and projects beyond the side thereof to deliver the tubers into a wagon driven alongside the machine. The lower portion of the elevator 79 is disposed within a transverse hopper 82 which is secured upon the rear end of the main frame 70 and has an expanded mouth 83 on its front side to receive the tubers. Within said hopper, on the end wall thereof, is a hinged deflector plate 84 by which the bodies will be directed onto the elevator chains and prevented from dropping to the ground between the chains and the wall of the hopper. If the parts should be clogged, the plate may be easily swung upward to permit inspection and proper attention.

As the machine is drawn along the row of beets, the roots are lifted from the ground by the digger and delivered onto the conveyer 9 which carries them upwardly and deposits them upon the divider table 20 down which they roll to the respective conveyer tables 32. The attendants upon the platforms 44 grasp the beet bodies and present the heads thereof to the respective cutters 56 so that the tops will be severed and at once drop into the hopper 46. Large clods and loose sand will be shaken from the bodies as they are carried up the conveyer 9 but some clods may cling to the bodies even after they reach the conveyer tables 32. These clods may be shaken or knocked off by the attendants and will be carried rearwardly by the elements 32 and escape over the rear ends of the same to fall to the ground. The topped bodies are tossed into the hopper 82 by the attendants and are at once taken up by the elevator 79 and delivered to the trailing wagon.

From the foregoing description, taken in connection with the accompanying drawings, it will be seen that I have provided a very compact and simple machine which will serve to expeditiously and economically harvest a crop of beets or other tubers.

Having thus described the invention, I claim:

1. A beet harvester comprising a wheeled frame, a digger carried by said frame at the front end thereof, an elevator receiving the beets from the digger, a divider table arranged at the rear of the elevator and inclining from its center toward both sides, a shield at the rear of the divider table, conveyers arranged at the sides of the divider table and receiving beets therefrom, and rotating cutters arranged between and adjacent the conveyers at the rear of the shield.

2. In a beet harvester, a digger, an elevator at the rear of the digger, a divider table at the discharge end of the elevator, means for sliding said table transversely relative to the elevator whereby to selectively deflect beets partly toward each side or all toward one side, and conveyers at the sides of said table.

3. In a beet harvester, an elevator, a deflector below the discharge end of the elevator consisting of parallel transverse rods inclined from their centers to their ends, means for shifting the deflector laterally, and conveyers at the sides of the deflector.

In testimony whereof I affix my signature.

WILLIAM B. CONRAD. [L. S.]